Dec. 25, 1962 W. B. HOLDRIDGE 3,070,238
AUTOMATIC BAR FEED FOR LATHE
Filed Dec. 15, 1959 2 Sheets-Sheet 1

INVENTOR:
Warren Bornt Holdridge
By Smyth & Roston
Attorneys

Dec. 25, 1962 W. B. HOLDRIDGE 3,070,238
AUTOMATIC BAR FEED FOR LATHE
Filed Dec. 15, 1959 2 Sheets-Sheet 2
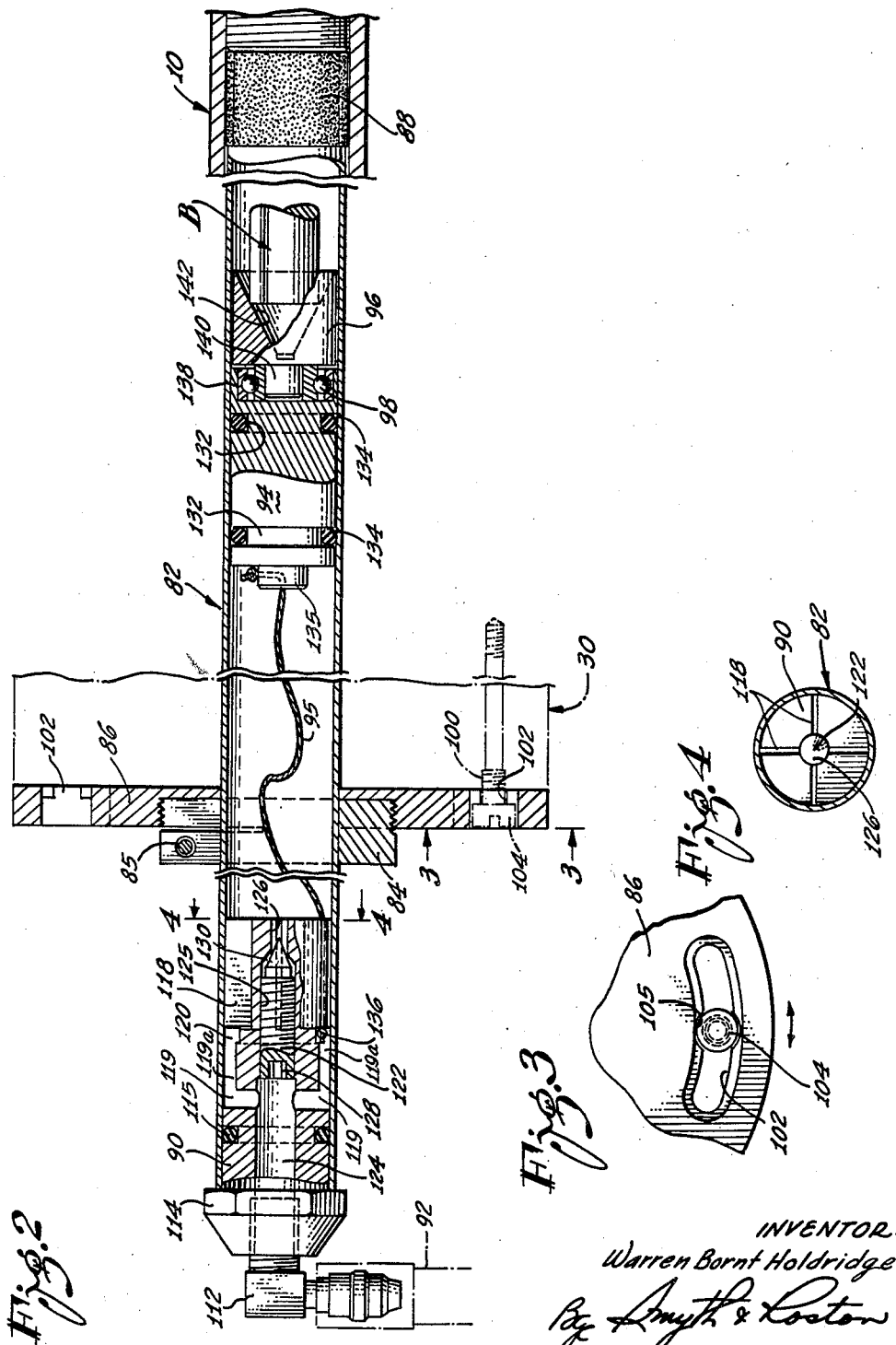
INVENTOR:
Warren Bornt Holdridge
By Smyth & Roston
Attorneys, 3,070,238
AUTOMATIC BAR FEED FOR LATHE
Warren Borni Holdridge, 5828 Santa Fe Ave.,
Los Angeles 58, Calif.
Filed Dec. 15, 1959, Ser. No. 859,753
1 Claim. (Cl. 214—1.4)

This invention relates to an assembly for automatically feeding bar stock to a lathe and, more particularly, relates to such an assembly for cooperation with a stock-gripping means to advance the bar stock automatically in response to opening of the stock-gripping means. The stock-gripping means may be either in the form of a collet or in the form of a chuck. With such an assembly, the operator need merely open the stock-gripping means briefly to permit a new increment of the bar stock to be advanced against a pre-adjusted stop and then close the stock-gripping means for machining the new increment.

The invention may be advantageously incorporated in the original factory construction of a lathe. The invention has special utility, however, in that it may be embodied in a relatively simple assembly to be sold as an accessory for use with existing conventional lathes. For the purpose of the present disclosure, the invention will be described as embodied in such an accessory assembly, and this description will provide adequate guidance for those skilled in the art who may have occasion to incorporate the same principles in the factory construction of a lathe.

Devices are currently available that employ compressed air to advance bar stock periodically to the collet of a lathe. Such a device typically comprises a long bar feed tube supported by a tripod at its outer or rear end and usually supported by a second tripod near the lathe. The most serious disadvantage of such a bar feed accessory is its excessive length and the necessity for tripod support. Such an arrangement takes up expensive floor space and is an obstacle that hinders the movements of workers in the vicinity of the lathe. In addition, the arrangement is cumbersome to handle and manipulate.

The present invention eliminates the need for a feed tube of excessive length and eliminates the need for any tripod support whatsoever by providing an assembly that mounts in the tube of a lathe that serves as a push-pull member for opening and closing the collet. Thus the accessory assembly of the invention is, in effect, incorporated into the construction of the lathe itself in a space-saving manner instead of being supported separate and apart from the lathe.

A special time and cost saving advantage of the invention is that it may be operated to advance an increment of bar stock without stopping the lathe. The invention takes advantage of the fact that a lathe of the type to which the invention pertains is equipped with conventional means to actuate the push-pull collet tube without the necessity of stopping the lathe. In the particular practice of the invention selected for the present disclosure, the accessory assembly is specifically adapted for use with a conventional pneumatically actuated means for opening and closing the collet while the lathe is running.

Broadly described, the invention employs a piston inside the collet-actuating tube and automatically applies compressed air to the piston in response to the opening of the collet. More specifically described as an accessory assembly, the invention employs such a piston in what may be termed a bar feed tube that telescopes into the rotary collect-actuating tube.

In the particular embodiment of the invention selected for the present disclosure, the feed tube is held against actuation in the collet tube by what may be termed an adapter which is fixedly mounted on the non-rotating air cylinder of a pneumatic collet operator. The adapter supports the feed tube at an intermediate point thereof and the forward end of the feed tube is supported by a suitable bearing collar that is embraced by the surrounding rotary collet tube.

The piston that is slidably mounted in the fixed feed tube carries a rotary seat for the rear end of the length of bar stock. Such a seat may comprise a body forming a tapered socket for the bar, the body being connected to the piston by a ball bearing. The seat member is self-centering the sense that under axial pressure the tapered socket forces the bar end into a concentric position.

The features and advantages of the invention may be understood from the following detailed description considered with the accompanying drawings.

In the drawings, which are to be regarded as merely illustrative:

FIG. 2 is a longitudinal section on a larger scale o the accessory assembly shown in FIG. 1;

FIG. 3 is an elevational view of a fragment of the adapter or locking plate showing how it receives a screw stud; and FIG. 4 is a transverse section taken as indicated by the line 4—4 of FIG. 3 to show the construction of a radially expansile member for closing the outer end of the feed tube.

Figure 1:
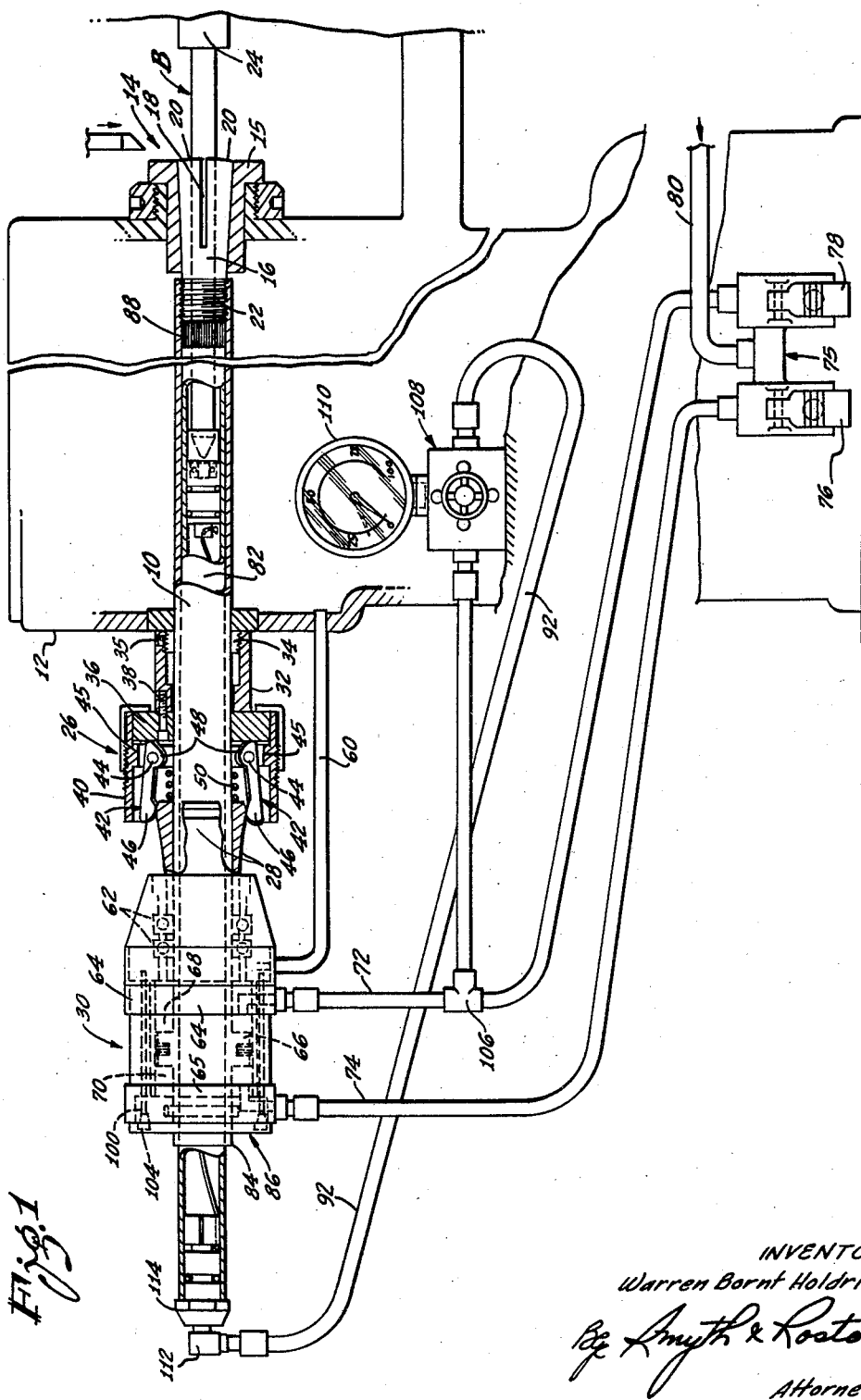
FIG. 1 is a simplified somewhat diagrammatic view partly in side elevation and partly in longitudinal section showing the present embodiment of the invention installed on a lathe.

In FIG. 1, a rotary collet tube 10 extending through a portion of the housing 12 of a lathe acts as a push-pull member to control a rotary collet that is generally designated by the numeral 14. The rotary collet 14 comprises the usual tapered sleeve 15 and a correspondingly flared collet member 16, the collet member having longitudinal slots 18 to form flexible collet fingers 20 to grip a length of bar stock designated B. The collet fingers 20 are biased radially outward to tend to release the bar B and are tightened against the bar B by wedge action when the collet member is drawn tightly into the tapered sleeve 15. The rotary collet tube 10 is connected to the collet member 16 by screw threads 22. Thus, as viewed in FIG. 1, a slight radial shift of the rotary collet tube 10 shifts the collet member 16 free from the tapered sleeve 15 to release the bar B and, conversely, the return leftward shift of the rotary collet tube tightens the collet member 16 in the tapered sleeve to grip the bar.

In a well-known manner, the collet 14 is opened to advance the bar B against a pre-adjusted stop means 24 to cause a measured portion of the bar to be exposed for machining. The collet is then closed to grip the bar and the bar is rotated for the desired machining operations. Finally, a cutting tool 25 is moved against the rotating bar to cut off the machined part. The collet 14 is then opened and the bar is again advanced against the stop means 24 for repeating the operating cycle to produce a new part.

The rotary collet tube 10 is shown as equipped with an air-actuated collet operator which comprises what may be termed a cam lever assembly, generally designated 26, a wedge sleeve 28 for reciprocation to actuate the cam lever assembly, and an air cylinder 30 to reciprocate the wedge sleeve. Since such an air-actuated collet operator is well-known, only a general description is deemed necessary.

The cam lever assembly 26 is fixedly mounted on the lathe housing 12 by a short cylinder 32 which is threaded onto a fixed bushing 34 and is secured by a set screw 35. A collar 36 is mounted on the end of the short cylinder 32 by screws 38 and a cylindrical guard 40 is mounted on the collar 36 to surround a series of circumferentially spaced cam levers 42.

The cam levers 42 are mounted by pivots 44 on corresponding brackets 45 that are fixedly carried by the rotary collet tube 10. The cam levers 42 have operating arms 46 that overhang the wedge sleeve 28 for actuation thereby. The opposite arms of the cam levers 42 are cam elements 48 which act or "heel" against the fixed collar 36.

The wedge sleeve 28 and the cam levers 42 rotate with the collet tube 10 with the cam levers 42 acting against the stationary collar 36. When the wedge sleeve 28 is shifted rightward to spread the operating arms 46 of the cam levers radially outward, as shown in FIG. 1, the cam elements 48 act against the fixed collar 36 to shift the rotary collet tube 10 leftward to close or tighten the collet 14 on the bar B. On the other hand, when the wedge sleeve 28 is shifted slightly leftward from the position shown in FIG. 1, the cam elements 48 are retracted relative to the fixed collar 36 to permit the collet tube to shift rightward to cause the collet to open. A coil spring 50 in compression between the wedge sleeve 28 and the brackets 45 continuously urges the collet tube 10 rightward for opening of the collet.

The air cylinder 30 is journaled on the rotary collet tube 10 to remain stationary and is held against rotation by an anchoring arm 60 that engages the lathe housing 12. Since the air cylinder 30 operates by reciprocating slightly, the anchoring arm 60 is in sliding engagement with the lathe housing. The forward end of the air cylinder 30 overhangs the rotary wedge sleeve 28 and is operatively connected thereto by thrust bearings 62.

The air cylinder is closed by a forward radial wall 64 and a rearward radial wall 65, both of which snugly and slidingly embrace the rotary collet tube 10. Between these two walls, the rotary collet tube 10 fixedly carries a piston 66 in sliding contact with the inner circumferential surface of the air cylinder to divide the interior of the air cylinder into a forward chamber 68 and a rearward chamber 70. A conduit in the form of an air hose 72 communicates with the forward chamber 68 through the forward radial wall 64 and a second air hose 74 communicates with the rearward chamber 70 through the rearward radial wall 65.

When compressed air is supplied to the forward chamber 68 with the rearward chamber 70 vented to the atmosphere, the air cylinder 30 is shifted to the right as viewed in FIG. 1 to shift the wedge sleeve 28 to cause the collet 14 to open. On the other hand, when compressed air is supplied to the rearward chamber 70 with the forward chamber 68 vented to the atmosphere, the air cylinder 30 shifts leftward to shift the wedge sleeve 28 leftward for closing or tightening the collet 14.

The action of the air cylinder 30 is controlled by suitable valve means. In the arrangement shown in FIG. 1, the valve means comprises a four-way valve, generally designated 75, which is operated in opposite respects by a left foot pedal 76 and a right foot pedal 78. The four-way valve 75 has an exhaust port (not shown) and has a central port connected to an air supply pipe 80. When the right foot pedal 78 is depressed, the four-way valve 75 supplies compressed air to the hose 72 and simultaneously vents the hose 74 to the atmosphere to cause the rotary collet 14 to open or loosen. On the other hand, when the left foot pedal 76 is depressed, compressed air is supplied to the hose 74 and the hose 72 is vented to the atmosphere to cause the rotary collet 14 to close or tighten.

All of the structure described to this point is conventional and well-known.

The presently preferred embodiment of the invention comprises the accessory assembly shown in FIGS. 2, 3 and 4. The principal parts of the assembly include: a bar feed tube 82 adapted to be telescoped in a fixed manner into the rotary collet tube 10; a split collar 84 tightened by a screw 86 to clamp and immobilize the feed tube 82; a quickly releasable adapter or locking plate 86 which carries the split collar and is adapted for mounting on the rear end of the air cylinder 30; a lubricant-impregnated bearing sleeve 88 to support the forward end of the feed tube 82 in the surrounding collet tube 10; a radially expansile plug 90 to serve as an end wall for the rear end of the feed tube 82; an air hose 92 for supplying compressed air to the interior of the feed tube 82 through the plug 90; a free piston 94 floatingly mounted in the feed tube 82; a cable-like member 95 in the feed tube to limit the forward travel of the piston 94; and a rotary seat member 96 mounted on the piston 94 by a ball bearing 98 to serve as a self-centering support for the rear end of a bar B.

The quickly releasable adapter or locking plate 86 replaces a similar plate at the end of the air cylinder 30 and may be of any suitable construction to permit it to be quickly and conveniently mounted and dismounted since it may be desirable to use a set of accessory assemblies interchangeably with the feed tubes of the different assemblies of different sizes for feeding different sizes of bar stock. In the construction shown, a pair of special stud screws 100 are supplied with the accessory for mounting in the end of the air cylinder 30 and the locking plate 86 is provided with a pair of diametrically opposite slots 102 to engage the heads 104 of the screw studs. Each of the slots is countersunk to receive the heads and is formed with a central enlargement or opening 105 for entrance of the stud head.

To mount a locking plate 86 on the air cylinder 30, it is merely necessary to move the locking plate past the heads 104 of the screw studs and then rotate the locking plate slightly to shift the enlargements 105 of the slots 102 out of register with the heads. The stud screws may then be quickly tightened. Preferably the rim of the locking plate 86 is knurled to facilitate this operation.

The air hose 92 is connected in any suitable manner to a source of compressed air under control of a valve, the arrangement being such that compressed air is supplied to the hose 92 whenever compressed air is supplied to the hose 72 to open the rotary collet 14. In the present embodiment of the invention, the hose 92 is simply connected to the hose 72 by a T fitting 106 so that the bar stock will be advanced automatically in the feed tube 82 whenever the four-way valve 75 is manipulated to open the collet. A pressure regulator 108 may be connected into the air hose 92 to permit the operator to reduce the air pressure to an appropriately low value under the guidance of a pressure gauge 110. As shown in FIG. 2, the end of the air hose 92 is connected to the rear end of the feed tube 82 by an elbow fitting 112 that screws into an enlarged hexagonal head 114 of the plug 90.

The plug 90 fits snugly into the feed tube 82 and is circumferentially grooved to seat an O-ring 115 for sealing the end of the tube. The inner end of the plug 90 is radially expansile by virtue of an axial bore and four radial slots 118 that divide the end of the plug into four quadrants. The plug is reduced in diameter by a circumferential groove 120 to make the quadrants sufficiently flexible to be spread by a wedge screw 122. The axial bore is divided into three parts, an entrance portion 124 of sufficient diameter for free admission of the wedge screw, an intermediate tapped portion 125 in which the wedge screw is threaded, and a third end portion 126 of reduced diameter. The circumferential groove 120 of the plug is in communication with the four radial slots 118 and the entrance portion 124 of the axial bore of the plug communicates with the circumferential groove by means of two radial bores 119 and two corresponding longitudinal grooves 119a in the periphery of the plug. The wedge screw 122 is formed with a hexagonal socket 128 for manipulation by a suitable wrench and is formed with a tapered nose 130 that wedges into the end portion 126 of the axial bore. It is apparent that the wedge screw 122 may be tightened to spread the four quadrants of the plug into positive engagement with the surrounding feed tube 82.

As shown in FIG. 2 the passage through the plug 90 for supplying compressed air to the interior of the feed tube 82 includes the entrance portion 124 of the axial bore of the plug, the two radial bores 119, the two corresponding longitudinal grooves 119a, the circumferential groove 120 and the four radial slots 118.

The floating piston 94 may be of any suitable construction. In this instance, the floating piston is a metal body with a pair of axially spaced circumferential grooves 132 seating corresponding O-rings 134. The rear end of the piston is formed with an axial boss 135 which is suitably bore for anchorage of one end of the cable 95, the opposite end of the cable extending into one of the radial slots 118 of the plug 90 and being secured therein by a knot 136.

The forward end of the floating piston 94 is formed with a cylindrical skirt 138 in which is mounted the outer race of the ball bearing 98. The rotary seat member 96 is formed with a hub portion 140 which is embraced by the inner end race of the ball bearing. The rotary seat member 96 is formed with a conical seat or socket 142 to receive the end of the bar B. It is apparent that when the rotary seat member 96 is forced against the end of the bar by compressed air acting on the piston 94, the bar end seeks an axial position in the tapered socket. Thus the rotary seat member 96 cooperates with the rotary collet 14 to support the bar B at two longitudinally spaced points.

Since the adapter or locking plate 86 may be quickly mounted and dismounted, it is a simple matter to remove the locking plate and thus remove the whole accessory assembly shown in FIG. 2 to permit a new piece of bar stock to be inserted into the bar feed tube 82. Before removing the accessory assembly, however, the stub end of the previous bar is simply ejected through the collet by stepping on the right foot pedal 78 to cause the collet to be opened and to cause compressed air to act simultaneously on the floating piston 94.

When the accessory assembly is replaced by re-engaging the locking plate 86 with the air cylinder 30, the operator depresses the right foot pedal 78 to open the collet and simultaneously admit compressed air to the feed tube 82 to advance the bar stock against the stop 24. The operator then steps on the other pedal 76 to close the collet and at the same time release th fluid pressure in the feed tube. When the advanced portion of the bar B is machined and the cutting tool 25 cuts off the finished piece, the lathe continues to operate without interruption while the operator again steps on the right pedal 78 to open the collet and advance the bar and then steps on the left pedal 76 to close the collet. This cable 95 is added for safety to eliminate any possibility of the piston 94 being expelled forcibly from the feed tube in a hazardous manner.

It is to be noted that the bar feed tube 82 serves, in effect, as a stationary liner for the collet tube 10. It will be apparent to those skilled in the art, however, that if the invention is incorporated in the factory construction of the lathe, the rotary collet tube 10 may itself be sealed off and equipped with a piston to serve as a bar feed tube. With the piston rotating with the collet tube, the piston may be formed with the conical seat for the bar end. In such a construction, the elbow fitting 112 would be replaced by a swivel-type elbow fitting.

My description in specific detail of the selected practice of the invention will suggest various changes, substitutions and other departures from my disclosure within the spirit and scope of the appended claim.

I claim:

An assembly for feeding a bar to a lathe having a tubular spindle and equipped with a bar-gripping means wherein the gripping means is controlled by means including an air cylinder, said air cylinder being connected to control valve means to supply air under pressure to open the gripping means and to supply air under pressure to close the gripping means, said assembly including: a bar feed tube dimensioned to telescope into said spindle; means for attachment to the lathe to hold the bar feed tube telescoped into the lathe spindle for sole support by the lathe; a piston floatingly mounted inside said bar feed tube to push a bar through the spindle; a quickly releasable screw-actuated radially expansile insert normally closing off the rear end of said bar feed tube; and means to introduce fluid under pressure into said bar feed tube in response to operation of said control valve means to advance the bar whenever the gripping means is opened.

References Cited in the file of this patent

UNITED STATES PATENTS

| | | |
|---|---|---|
| 447,010 | Eddy | Feb. 24, 1891 |
| 1,794,369 | Edgar | Mar. 3, 1931 |
| 2,272,720 | Mariotte | Feb. 10, 1942 |
| 2,300,457 | Mariotte | Nov. 3, 1942 |
| 2,327,916 | Mariotte | Aug. 24, 1943 |
| 2,334,272 | Mariotte | Nov. 16, 1943 |
| 2,339,712 | Mariotte | Jan. 18, 1944 |
| 2,363,745 | Peterson | Nov. 28, 1944 |
| 2,572,741 | McCoy | Oct. 23, 1951 |
| 2,601,494 | Baule | June 24, 1952 |
| 2,626,451 | Gridley | Jan. 27, 1953 |
| 2,626,452 | Gridley | Jan. 27, 1953 |
| 2,746,128 | Barron | May 22, 1956 |
| 2,782,044 | Gabriel | Feb. 19, 1957 |
| 2,892,243 | Lanphere | June 30, 1959 |
| 2,906,540 | Butterworth | Sept. 29, 1959 |

FOREIGN PATENTS

| | | |
|---|---|---|
| 723,066 | Germany | July 28, 1942 |
| 116,896 | Australia | Apr. 27, 1943 |